(12) United States Patent
Kemp

(10) Patent No.: US 8,088,257 B2
(45) Date of Patent: Jan. 3, 2012

(54) SOLAR DISTILLATION SYSTEM

(75) Inventor: Hillery Thomas Kemp, Many, LA (US)

(73) Assignee: KII, Inc., Richmond, IN (US)

( * ) Notice: Subject to any disclaimer, the term of this patent is extended or adjusted under 35 U.S.C. 154(b) by 643 days.

(21) Appl. No.: 12/254,487

(22) Filed: Oct. 20, 2008

(65) Prior Publication Data

US 2009/0107831 A1 Apr. 30, 2009

Related U.S. Application Data

(60) Provisional application No. 61/000,229, filed on Oct. 25, 2007.

(51) Int. Cl.
*B01D 3/02* (2006.01)
*B01D 3/04* (2006.01)
*C02F 1/04* (2006.01)
*C02F 1/14* (2006.01)

(52) U.S. Cl. ...... 202/234; 159/26.2; 159/43.1; 159/901; 159/903; 159/DIG. 15; 202/237; 202/366; 202/267.1; 202/267.2; 202/269; 203/10; 203/86; 203/98; 203/100; 203/DIG. 1

(58) Field of Classification Search ............... 159/26.2, 159/43.1, 901, 903, DIG. 15, DIG. 40, DIG. 42; 202/234, 237, 266, 267.1, 267.2, 269; 203/10, 203/86, 98, 100, DIG. 1, DIG. 17
See application file for complete search history.

(56) References Cited

U.S. PATENT DOCUMENTS

| | | | |
|---|---|---|---|
| 3,607,670 A * | 9/1971 | King | 203/23 |
| 3,649,163 A | 3/1972 | McCusker | |
| 3,930,958 A | 1/1976 | Marvichi | |
| 3,992,246 A | 11/1976 | Welch | |
| 4,235,679 A | 11/1980 | Swaidan | |
| 4,504,362 A * | 3/1985 | Kruse | 203/1 |
| 4,563,248 A | 1/1986 | Anderson | |
| 4,982,782 A | 1/1991 | Albers | |

(Continued)

FOREIGN PATENT DOCUMENTS

JP 01-070184 3/1989

(Continued)

OTHER PUBLICATIONS

"Climatic Causes of Aridity," Power Point Presentation from Chapter 2 of Desert Meteorology by Thomas T. Warner, Cambridge University Press, 2004.

(Continued)

*Primary Examiner* — Virginia Manoharan
(74) *Attorney, Agent, or Firm* — Woodard, Emhardt, Moriarty, McNett & Henry LLP

(57) ABSTRACT

The present disclosure is generally directed to a solar distillation system capable of recovering potable water from non-potable water. In certain embodiments, the system includes a substantially air tight solar still having a rooftop composed of a solar light-transmitting material. The solar still includes a tube positioned below and running underneath the roof top, the tube having an exit end. Additionally, the solar still includes a heating surface positioned below the roof top and adapted for receiving at least a portion of the non-potable water exiting the tube at the exit end. Non-potable water on the heating surface is solar heated and a portion of the non-potable water evaporates and condenses on the outside of the tube to be collected as potable water.

15 Claims, 6 Drawing Sheets

U.S. PATENT DOCUMENTS

| | | | |
|---|---|---|---|
| 5,067,272 | A | 11/1991 | Constantz |
| 5,158,650 | A * | 10/1992 | Wilkerson ............... 202/234 |
| 5,281,310 | A | 1/1994 | Djelovah et al. |
| 5,421,962 | A | 6/1995 | Shvarts et al. |
| 5,628,879 | A * | 5/1997 | Woodruff ............... 202/234 |
| 5,744,008 | A | 4/1998 | Craven |
| 5,840,159 | A | 11/1998 | Rosenblad |
| 6,274,004 | B1 | 8/2001 | Anderson |
| 6,342,127 | B1 * | 1/2002 | Possidento ............ 202/234 |
| 6,440,275 | B1 | 8/2002 | Domen |
| 6,797,124 | B2 * | 9/2004 | Ludwig ............... 202/234 |
| 6,868,690 | B2 | 3/2005 | Faqih |
| 7,008,515 | B1 * | 3/2006 | Husson et al. ............ 202/83 |
| 7,416,643 | B2 * | 8/2008 | Yonover ............ 202/234 |
| 7,494,572 | B2 * | 2/2009 | Tonkin et al. ............ 203/10 |
| 7,857,945 | B2 * | 12/2010 | Al-Garni et al. ........... 202/234 |
| 2004/0060808 | A1 | 4/2004 | La Violette |
| 2005/0189209 | A1 | 9/2005 | Craven |

FOREIGN PATENT DOCUMENTS

| | | | |
|---|---|---|---|
| JP | 05-057272 A | | 3/1993 |
| WO | 85/04159 | * | 9/1985 |

OTHER PUBLICATIONS

Giseppe Fiorenza, T., "Techno-Economic Evaluation of a Solar Powered Water Desalination Plant" in L. Rizzuit et al. (eds.), Solar Deslantination for the 21st Century (Springer, Netherlands, 2007), pp. 33-41.

Korovessis, Nicholas A., "Solar Saltwork Productions Process Evolution—Wetland Function," Proceedings of the Post Conference Symposium "SALTWORKS": Preserving Saline Coastal Ecosystems—Global NEST Samos, 1999.

Schley, W. et. al. of Post, Buckley, Schuh & Jernigan, Inc., "Cost Effectiveness of Evaporative Treatment Processes," Special Publication SJ96-SP12, prepared for St. Johns River Water Management District, 1996.

U.S. Congress, Office of Technology Assesment, "Using Desalintation Technologies for Water Treatment", OTA-BP-O-46 (Washington, DC: U.S. Government Printing Office, Mar. 1988).

PCT International Search Report, PCT/US2008/080635, date of mailing May 29, 2009, 3 pages.

PCT Written Opinion of the International Searching Authority, PCT/US2008/080635, dated of mailing May 29, 2009, 3 pages.

PCT International Search Report, PCT/US2010/052801, date of mailing Jun. 24, 2011, 5 pages.

PCT Written Opinion of the International Searching Authority, PCT/US2010/052801, dated of mailing Jun. 24, 2011, 4 pages.

* cited by examiner

SOLAR DISTILLATION SYSTEM

CROSS-REFERENCE TO RELATED APPLICATIONS

This application claims the benefit of U.S. Provisional Application No. 61/000,229, filed Oct. 25, 2007, which is hereby incorporated by reference.

FIELD OF THE DISCLOSURE

The present disclosure relates generally to a solar distillation system, and more particularly to a system for solar distillation of non-potable water, particularly in large quantities, to obtain potable water.

BACKGROUND OF THE DISCLOSURE

Rain patterns throughout the world are not readily predictable or reliable and irrigation from ground or riparian water is often the main source of agricultural water. Similarly, industrial and municipal water systems rely on these sources. Furthermore, hydraulic models predict diminishing water availability per individual over the next 25-50 years, with the greatest losses being in those areas now considered arid or semiarid. Desertification, the process of non-dessert becoming desert, is increasing, not only in China and north Africa, but in the United States where more than 30% of the land west of the Mississippi shows signs of desertification. Thus, even on our blue planet which is covered over three fourths of its surface with water, less than 1% is potable.

The present system is especially suited to producing fresh or potable water from sea water in west coast deserts in the rain shadow created by cold ocean currents offshore (e.g., the Sahara, Namibia, Australia, et al.). It is applicable in many other areas as well. The present system may be implemented to provide large quantities of water from salty water to supply irrigation, industrial and municipal water by using inexpensive material, already widely available at low costs throughout the world with minimal energy required and simple operation and upkeep.

Attempts have been made in the past to provide solar stills capable of producing relatively large quantities of potable water. These attempts have proven to be costly and inefficient and have failed at producing large quantities of potable water. Therefore, a need exists for an improved solar distillation system.

SUMMARY OF THE DISCLOSURE

In certain embodiments, a solar distillation system comprises an elongated solar still having a first end, a second end and extending along a longitudinal axis between the first and second ends. The solar still includes a plurality of frame supports positioned along the longitudinal axis and a light-transmitting canopy supported on the frame supports extending along the longitudinal axis of the solar still and covering the first and second ends. Additionally, the solar still includes an elongate heating surface having opposite first and second ends, the heating surface extending substantially the length of the solar still and is enclosed within the canopy. The first end of the heating surface is positioned adjacent the first end of the solar still and the second end of the heating surface is positioned adjacent the second end of the solar still. The solar still further includes at least one tubular member having first and second ends and extending substantially the length of the solar still, the tubular member being enclosed within the canopy and is spaced above the heating surface, and the second end of the tubular member being positioned adjacent the second end of the solar still. Further, the solar still includes at least one collection trough having a first end and a second end, the first end being positioned adjacent the first end of the solar still and the second end being positioned adjacent the second end of the solar still, and the collection trough being positioned below and aligned with the tubular member to receive condensed water dripping from the tubular member. The solar still also includes a liquid distributor positioned adjacent the second end of the heating surface, wherein the liquid distributor is configured to distribute water received from the second end of the tubular member substantially across the width of the heating surface.

In certain other embodiments, a water distillation apparatus comprises a roof top composed of a light-transmitting material, a tube positioned below and running underneath the roof top, and a collection device positioned below and aligned with the tube. Non-potable water within the apparatus is solar heated and a portion of the non-potable water evaporates, condenses on the outside of the tube as potable water, and drips into the collection device.

In yet other embodiments, a solar desalination system comprises an intake pump subsystem having a pump inlet and a pump outlet, and a condensation subsystem including a solar still housing with a light-transmitting roof and a tubular member housed within the solar still housing, the tubular member having an intake end and an exit end, with the pump outlet being operatively coupled to the intake end. The system includes a collection trough positioned below and aligned with the tubular member within the solar still housing, the trough having a first end and a second end, and a heating surface positioned within the solar still housing, the heating surface having an intake end and an exit end. Additionally, the system includes a potable water pump subsystem having a pump inlet and a pump outlet, the pump inlet of the potable water pump subsystem being operatively coupled to the second end of the collection trough. The intake pump subsystem is configured to pull cool ocean water through the pump inlet from the ocean water environment and pump the cool ocean water out the pump outlet and into the intake end of the tubular member, wherein at least a portion of the ocean water is caused to exit through the exit end of the tubular member and be released on the heating surface at or near the intake end of the heating surface so that solar heating of the ocean water on the heating surface causes a portion of the water to evaporate from the heating surface, condense on the outside of the cool tubular member, and drip into the collection trough. Additionally, the potable water pump subsystem is configured to pull potable water from the collection trough through the pump inlet of the potable water pump subsystem.

In even other embodiments, a water distillation apparatus comprises a substantially air tight solar still having a roof top composed of a light-transmitting material. The solar still includes a tube positioned below and running underneath the roof top, the tube having an exit end. Additionally, the solar still includes a heating surface positioned below the roof top and adapted for receiving at least a portion of the non-potable water exiting the tube at the exit end. Non-potable water on the heating surface is solar heated and a portion of the non-potable water evaporates and condenses on the outside of the tube to be collected as potable water.

DESCRIPTION OF THE ILLUSTRATED EMBODIMENTS

Figure 1:
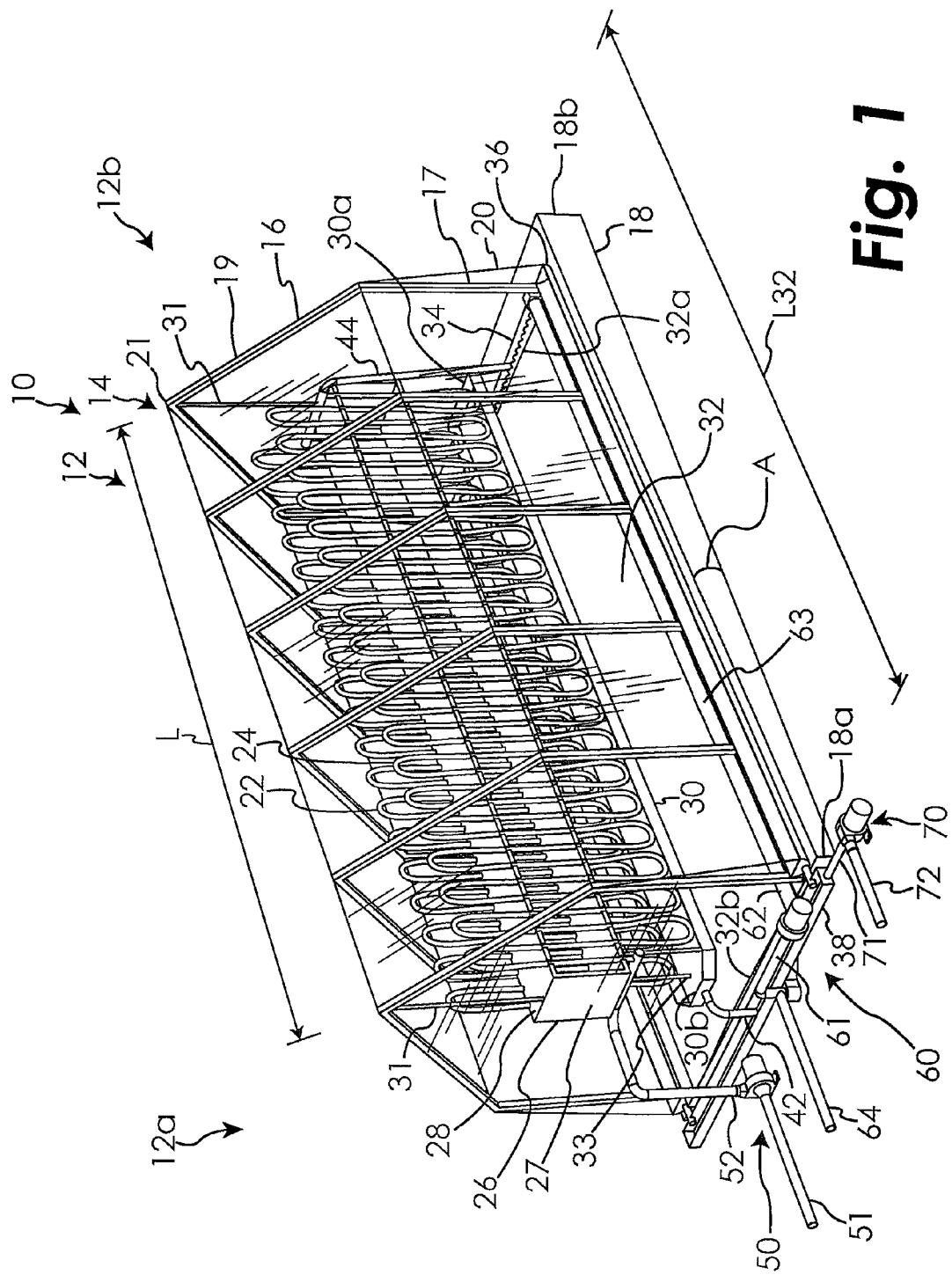
FIG. 1 is a perspective view of a solar distillation system according to an embodiment of the present disclosure.
Figure 2:
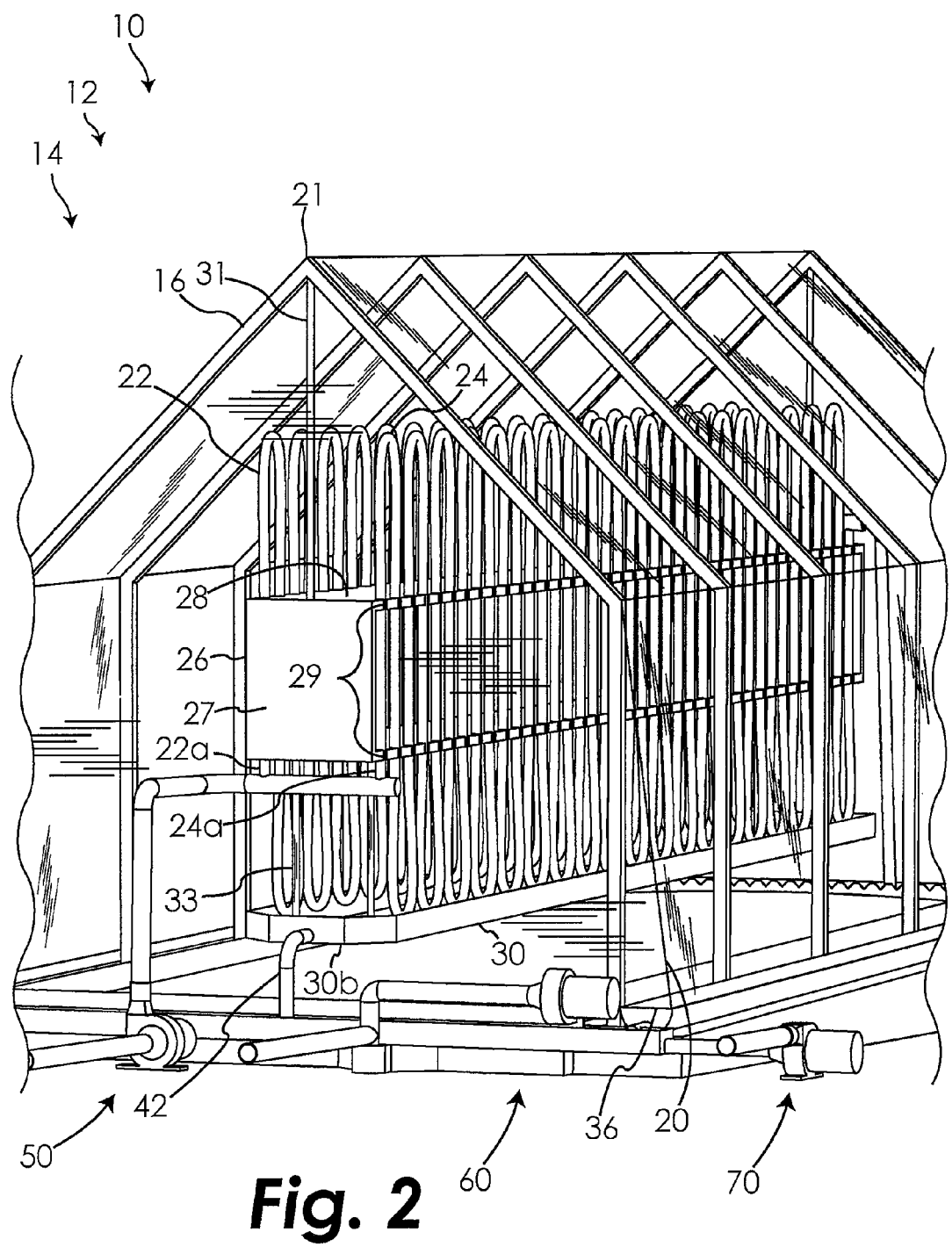
FIG. 2 is a close-up perspective view of a portion of the solar distillation system of FIG. 1.

For the purposes of promoting an understanding of the principles of the disclosure, reference will now be made to the embodiments illustrated and specific language will be used to describe the same. It will nevertheless be understood that no limitation of the scope of the disclosure is thereby intended, such alterations, modifications, and further applications of the principles of the disclosure being contemplated as would normally occur to one skilled in the art to which the disclosure relates.

The present disclosure is generally directed to a solar distillation system capable of recovering potable water from non-potable water. It is contemplated that the solar distillation system described herein can be implemented on a large scale to treat large quantities of non-potable water and thereby recover large quantities of potable water. As discussed in greater detail, the present system can be used as a desalination system to recover potable water from salty water, such as sea or ocean water. However, it should also be appreciated that the present system can be used to recover potable water from wastewater, contaminated freshwater, and other types of non-potable water.

FIGS. 1-6 generally illustrate a solar distillation system 10 operable to recover potable water from non-potable water. As evident from the illustrations, the main structure of system 10 is a condensation subsystem, or solar still 12. Solar still 12 is a generally elongate structure having a first end 12a, an opposite second end 12b, and a length L extending along a longitudinal axis. In the particular illustrated embodiment, solar still 12 includes a housing 14 defined by a plurality of frame supports 16 extending substantially along the length L of the still 12. In certain embodiments, the supports 16 engage a base member 18 supporting many of the components of system 10. However, it should be appreciated that in some embodiments the base member 18 may be absent with the supports 16 being mounted in the ground or another appropriate surface.

The illustrated frame supports 16 each include two angled segments 19 meeting at a peak 21 and two parallel base segments 17 extending down from segments 19. In a particular embodiment, the acute angle between segments 19 is about 45 degrees, such that the angled segments 19 extend up at a 1:1 stepping ratio. However, it is contemplated that in other embodiments the angle could be greater or less than 45 degrees. Although the illustrated embodiment shows the frame supports as peaked at the top, it should be appreciated that in other embodiments the frame supports may be arched at the top or flat along the top, rather than peaked. In certain embodiments, the frame supports 16 may be composed of an appropriate metal or plastic material. Additionally, the illustrated size, spacing, configuration and arrangement of the frame supports can be varied as would occur to one of ordinary skill in the art.

As illustrated, optional base member 18 having a first end 18a and an opposite second end 18b may be inclined such that second end 18b is positioned higher than first end 18a. Accordingly, the components housed within solar still 12 and supported by base member 18 will also be correspondingly angled from first end 12a up to second end 12b. The inclining allows for gravitational flow along or within certain elements within system 10, as will be discussed in greater detail below. In alternative embodiments, base member 18 may be level or may be absent, and one or more of the components housed within solar still 12 may be inclined by virtue of its mounting or positioning arrangement within the solar still. In yet other embodiments, base member 18 may be absent and solar still 12 may be positioned on an inclined ground or floor surface. In certain embodiments, base member 18 may define an incline angle A in the range of 2 degrees to 10 degrees. However, it should be appreciated that base member 18 may be designed to create greater or less inclining of the various components. The base member 18 may be composed of any appropriate material as would occur to one of ordinary skill in the art.

Housing 14 of solar still 12 also includes a solar light-transmitting roof top, such as the illustrated canopy 20 as one non-limiting example. Canopy 20 is supported on frame supports 16 and extends along and covers the length L and ends 12a and 12b of solar still 12 to maintain a substantially air tight environment within the still. The canopy 20 may define holes or passageways (not shown for clarity) through which pipes or conduits may pass through to engage with components housed within still 12. In certain embodiments, ends of the canopy 20 may be engaged with base 18 or the outer edges of the side gutters that will be discussed in greater detail below. It should be appreciated that the canopy may be secured or engaged in a variety of appropriate ways as would occur to one of ordinary skill in the art. In certain embodiments, the canopy 20 may be composed of a clear plastic film. In a particular embodiment, the canopy 20 may be composed of polyethylene or polypropylene plastic. In other embodiments, the canopy 20 may be composed of a variety of other appropriate materials which are capable of transmitting solar light, including glass as another non-limiting example. It should be appreciated that the arrangement and configuration of the light-transmitting roof top for the solar still is not critical to the present disclosure. Various other arrangements and configurations are possible as would occur to one of ordinary skill in the art. As an example, the frames and canopy may be replaced by a clear (or otherwise solar light-transmitting) plastic housing which is sufficiently rigid to maintain upright positioning.

Optionally, system 10 may include a ventilation system (not shown for ease of illustration) operable to allow for ambient air flow in and out of the solar still 12 and thereby prevent a vacuum occurring inside the solar still and to prevent excess pressure from building up inside the solar still. In certain embodiments, the ventilation system may be coupled with canopy 20. It is contemplated that the ventilation system may be configured, arranged, and incorporated with the solar still 12 in a variety of possible manners and at a variety of possible positions as would occur to one of ordinary skill in the art.

In preferred embodiments of the present disclosure, at least one tubular member is at least partially housed within the solar still underneath the solar light-transmitting roof top, whereby heat transfer occurring within the solar still causes potable water to condense on the outside of the tubular member and drip into an appropriate collection device. In certain embodiments, the tubular member(s) serve as conduits for cool non-potable water to be distilled by serving as the condensing element to collect water vaporized from a heating surface, as will be discussed in greater detail below.

In the illustrated embodiment, there are two tubular members 22 and 24 housed within solar still 12 and running in parallel from near first end 12a up to near second end 12b. Tubular members 22 and 24 include first intake ends 22a and 24a (see FIG. 2) to receive non-potable water and second exit ends 22b and 24b (see FIG. 3) to release non-potable water. As such, the tubular members 22 and 24 provide for two passes of non-potable water up the incline provided by base 18 in the illustrated embodiment. However, it should be appreciated that the tubular member(s) contemplated by the present disclosure may be arranged in numerous other possible manners as would occur to one of ordinary skill in the art. As an example, the system may include a single tubular member having an intake end at or near second end 12b of solar still 12, extending down the incline to first end 12a, wrapping around and extending back up the incline to second end 12b. As such, the single tubular member may provide for a single pass down the incline and a single pass back up the incline. As another example, the system may include two tubular members having intake ends at or near second end 12b of solar still 12, extending down the incline to first end 12a, joining together, wrapping around and extending back up the incline to second end 12b as a single tubular member. As such, the tubular members may provide for two passes down the incline and a single pass back up the incline. As can be understood by reference to the above examples, the many other possible arrangements are too numerous to list. In certain embodiments, it is preferred that the exit end of each of the tubular members 22 and 24 is positioned at or near the second end 12b of the solar still 12, and thus at the higher end of the incline so that the non-potable water may be released to flow down the incline along a heating surface as a result of gravity.

The one or more tubular members incorporated into the system may be curved. As illustrated, the tubular members 22 and 24 may be curved in an undulating fashion substantially along their length. In this way, increased surface area of the tubular members 22 and 24 can be provided within the solar still 12 without comprising much additional length. The tubular members 22 and 24 may optionally be curved in a variety of fashions as would occur to one of ordinary skill in the art. In other embodiments, the tubular members may extend substantially straight within the solar still.

The tubular members 22 and 24 may be composed of a variety of possible appropriate materials which allow for condensation on the exterior of the members as a result of heat transfer phenomenon. As one non-limiting example, the tubular members 22 and 24 may be composed of a plastic material, such as polyethylene. In a particular example embodiment, the tubular members 22 and 24 may be composed of cross-linked polyethylene, or PEX. Additionally, the sizing of the tubular members 22 and 24 is not critical to the present disclosure, as the size can be adjusted depending on the volume of water to be treated.

Additionally, the tubular members 22 and 24 may be positioned within solar still 12 in a variety of possible manners as would occur to one of ordinary skill in the art. In the illustrated embodiment, the tubular members 22 and 24 are carried on a frame 26 which is suspended from one or more frame supports 16 via rods 31. The example frame 26 includes parallel top and bottom pieces 28 and parallel end pieces 27, forming an elongate, rectangular frame. Additionally, in the illustrated embodiment, a plurality of notches 29 are defined along the edges of pieces 28 and configured to receive the tubular members 22 and 24. In certain embodiments, the tubular members may fit within notches 29 and remain positioned with respect to frame 26 via interference fit. In other embodiments, the tubular members may be held in place at least partially within the notches through the use of appropriate fasteners or adhesive. Additionally, it is contemplated that tubular members 22 and 24 can be carried in a variety of other appropriate ways as would occur to one of ordinary skill in the art, with the arrangement of frame 26 defining notches 29 being just one non-limiting example. In alternative embodiments, frame 26 is absent and the tubular members 22 and 24 are directly suspended from the frame supports 16 through the use of appropriate fasteners. In certain embodiments, it may be desirable to reduce the amount of shadow effect received the floor of the solar still as the shadow may reduce solar heating. As such, it may be desirable to minimize the size of frame 26, if present, to reduce the shadow displayed on the floor of the solar still.

In the illustrated embodiment, frame 26 is suspended from two frame supports 16 via rods 31. The illustrated rods 31 are connected with the frame supports 16 at peaks 21 and extend down to connect with frame 26 at the ends thereof. The rods 31 may be connected with the frame supports 16 and the frame 26 in numerous possible ways as would occur to one of ordinary skill in the art, including through the use of fasteners. In certain embodiments, the rods 31 may be composed of an appropriate metal or plastic material of sufficient strength to suspend the frame 26 and the tubular members 22 and 24 from frame supports 16. It should be appreciated that the manner of suspending or otherwise positioning the tubular members 22 and 24 within the solar still 12 is not critical to the present disclosure.

System 10 additionally includes a potable water collection trough 30 positioned below the tubular members 22 and 24 in an aligned fashion so that potable water condensing on the outside of tubular members 22 and 24 will drip into trough 30 for collection. Trough 30 includes an upper end 30a positioned adjacent second end 12b of solar still 12 and a lower exit end 30b positioned adjacent first end 12a of solar still 12. In the illustrated embodiment, trough 30 is suspended from frame 26 via four corner rods 33. However, it should be appreciated that the trough 12 may be positioned and arranged within solar still 12 in numerous other possible ways as would occur to one of ordinary skill in the art, with the suspension via corner rods 33 being just one non-limiting example. The optional rods 33 may be composed of an appropriate metal or plastic material of sufficient strength to suspend the trough 30 within solar still 12. Additionally, it should be appreciated that the trough 30 is just one non-limiting example of the numerous possible collection means contemplated by the present disclosure which could be incorporated into solar still 12 for the collection of condensed water from the outside surface of tubular members 22 and 24.

As illustrated, positioned below trough 30 and on base member 18 is a heating surface 32 having a high intake end 32a and a low exit end 32b. In certain embodiments, the heating surface 32 may extend substantially the length of the solar still underneath the tubular members 22 and 24 and the collection trough 30. However, it should be appreciated that the system components housed within solar still 12 may be arranged in a variety of other appropriate ways. Non-potable water exiting the tubular members 22 and 24 at ends 22b and 24b is released onto heating surface 32 at or near end 32a and the water is caused to flow down the heating surface 32. During use of the system, the water is solar heated whereby a portion of the water evaporates and condenses as potable water on the outside of the tubular members 22 and 24. Based on its positioning on base member 18, in certain embodiments the surface 32 may be inclined to enable gravitational flow of the water. Surface 32 may be composed of a variety of appropriate materials as would occur to one of ordinary skill in the art, including an impermeable plastic material as an example. Additionally, in certain embodiments, the surface 32 may be black in color to enhance the heating and evaporation of the water flowing along the surface.

Figure 4:
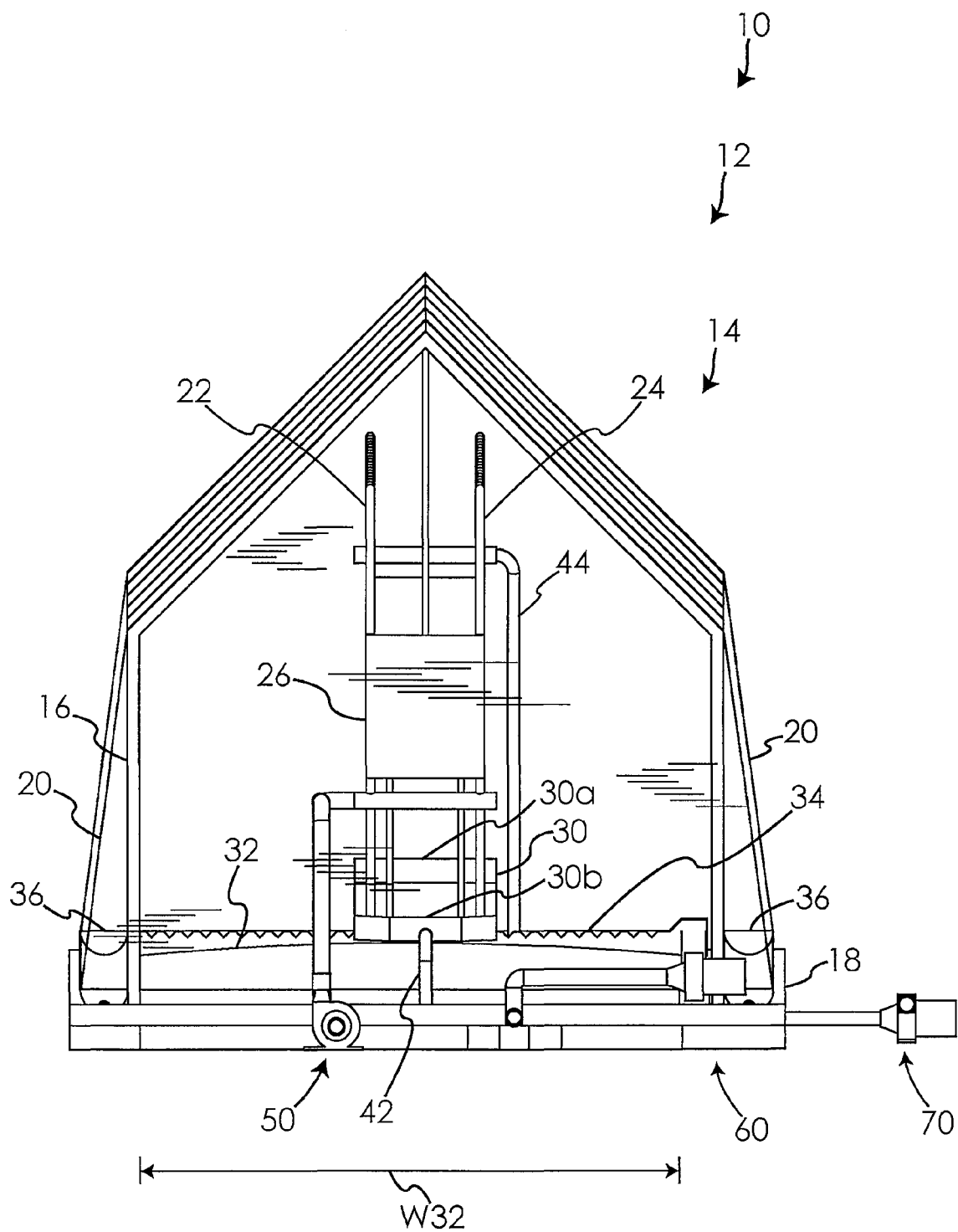
FIG. 4 is a front view of the solar distillation system of FIG. 1.

In certain embodiments, the heating surface 32 may optionally be arched along its width $W_{32}$ to urge the water flowing down surface 32 to spread across the width $W_{32}$ thereof (see FIG. 4). In this way, the arching of the surface 32 functions to offset the surface tension pull of the water toward the center of the heating surface 32 and serves to even the water flow. In certain embodiments, it may also be desirable for the water flow along surface 32 to be substantially parallel with the edges of the surface and the arching of the surface may assist in accomplishing this. Additionally, it also may be desirable for the water flow along surface 32 to be substantially uniform in thickness above the surface, in other words, with the water flow spread evenly across the width of the surface 32. In some embodiments, the arching across the width $W_{32}$ of surface 32 may extend the length $L_{32}$ of surface 32. Additionally, the surface 32 may be arched a greater or lesser amount than the example shown in FIG. 4. In certain embodiments, the amount of arching of surface 32 necessary to combat the center surface tension pull directly corresponds to the degree of incline of the surface 32. In such embodiments, the greater the incline of the surface 32, the greater the amount of arching across the width $W_{32}$ of the surface 32 may be incorporated into the system.

Figure 3:
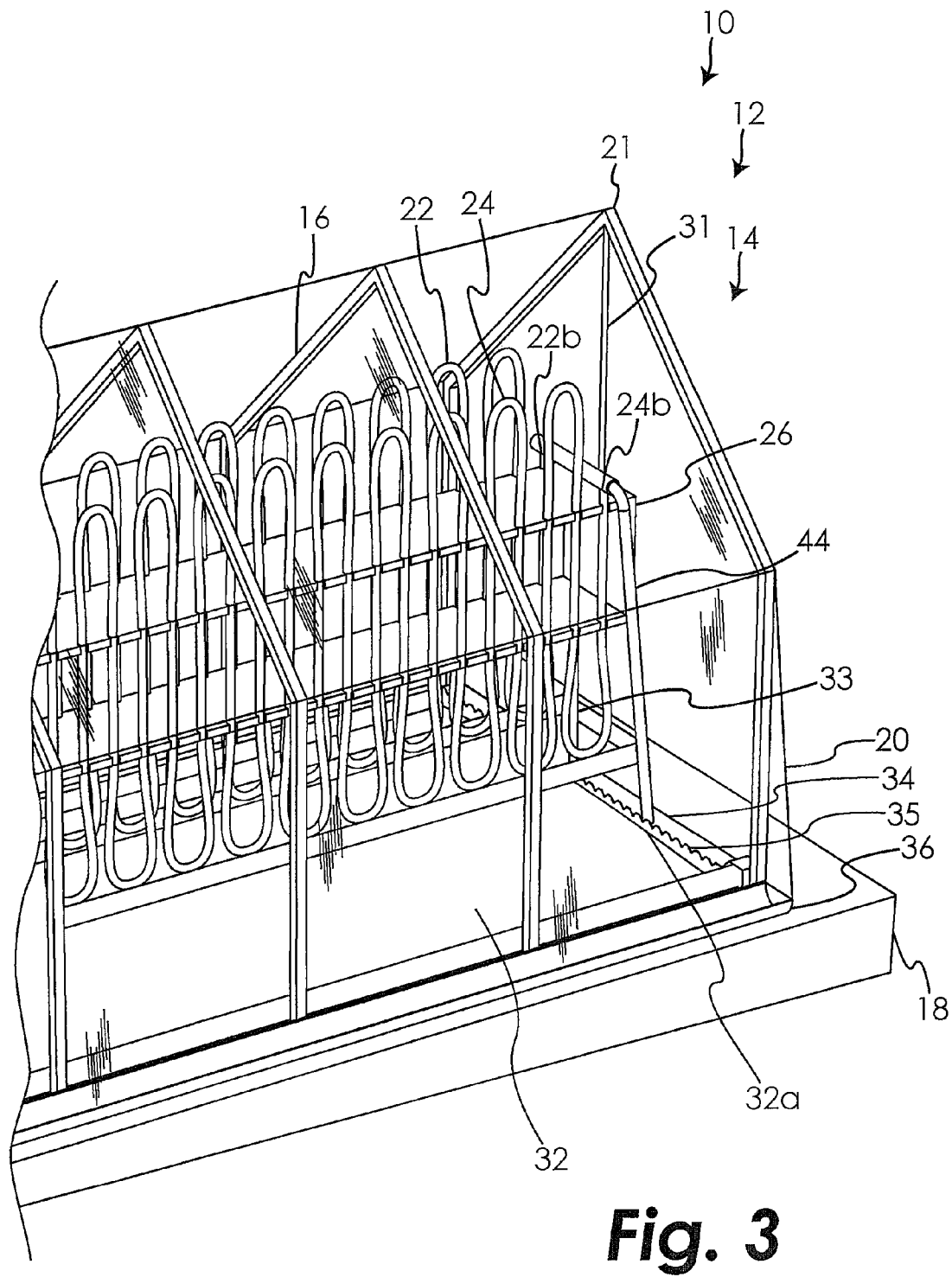
FIG. 3 is a close-up perspective view of a portion of the solar distillation system of FIG. 1.

In some embodiments, the system 10 may include a device to evenly distribute liquid exiting the tubular members 22 and 24 onto heating surface 32. FIG. 3 illustrates an example liquid distributor 34 positioned adjacent the upper end 32a of heating surface 32. The illustrated distributor 34 is an open-gutter having a plurality of v-notches 35 across the width of the distributor. The v-notches 35 serve to distribute water which has accumulated in distributor 34 substantially evenly and uniformly across the surface 32. It should be appreciated that the distributor 34 can be configured differently and can include other distribution means as would occur to one of ordinary skill in the art, with the v-notches 35 being just one non-limiting example. In the illustrated embodiment, a pipe 44 is coupled to ends 22b and 24b of tubular members 22 and 24 and leads into distributor 34 to transport water exiting the tubular members into the distributor. However, it should be appreciated that the configuration and arrangement involving pipe 44 to transfer the exiting water is just example of the numerous possible configurations and arrangements. In other embodiments, the tubular members 22 and 24 are arranged such that the ends 22b and 24b are positioned within or slightly above the distributor 34, with pipe 44 being absent.

In certain embodiments, system 10 may include a plurality of distributors along the length of the heating surface 32 to continually redistribute the flow of water across the width of the heating surface. In such embodiments, the plurality of distributors may be correspondingly arched with the heating surface, with the v-notches being level across the top. The plurality of distributors may serve to redistribute the water flow at desired intervals down the slope of the heating surface. As the length of the heating surface increases, it may be desirable to include additional distributors along the length of the heating surface.

Optionally, system 10 may include a non-potable water purge subsystem (not shown) at second end 12b of solar still 12 to reduce or otherwise control the amount of non-potable that is released onto heating surface 32 from tubular members 22 and 24. The purge subsystem may be coupled with the ends 22b and 24b of tubular members 22 and 24, the pipe 44, and/or the liquid distributor 34 to purge a portion of the water from solar still 12. The excess water may be transferred back to the surrounding water environment or another appropriate location as would occur to one of ordinary skill in the art.

System 10 may optionally include means for collecting potable water which condenses on the solar light-transmitting rooftop, such as canopy 10. In the illustrated embodiment, the system 10 includes two elongate side gutters 36 positioned alongside the canopy 20, on the inside thereof, and extending substantially the length L of the solar still 12. However, it should be appreciated that the use of gutters 36 is just one non-limiting example of the numerous possible mechanisms which could be incorporated into system 10 to collect potable water from the canopy or other appropriate roof-top member. In use, as potable water condenses on the inside of the canopy 20, the water droplets travel down canopy 20 and drip into the side collection gutters 36. The gutters 36 may be composed of an appropriate material as would occur to one of ordinary skill in the art. Additionally, the sizing and configuration of the gutters 36 are not critical to the present disclosure.

Figure 5:
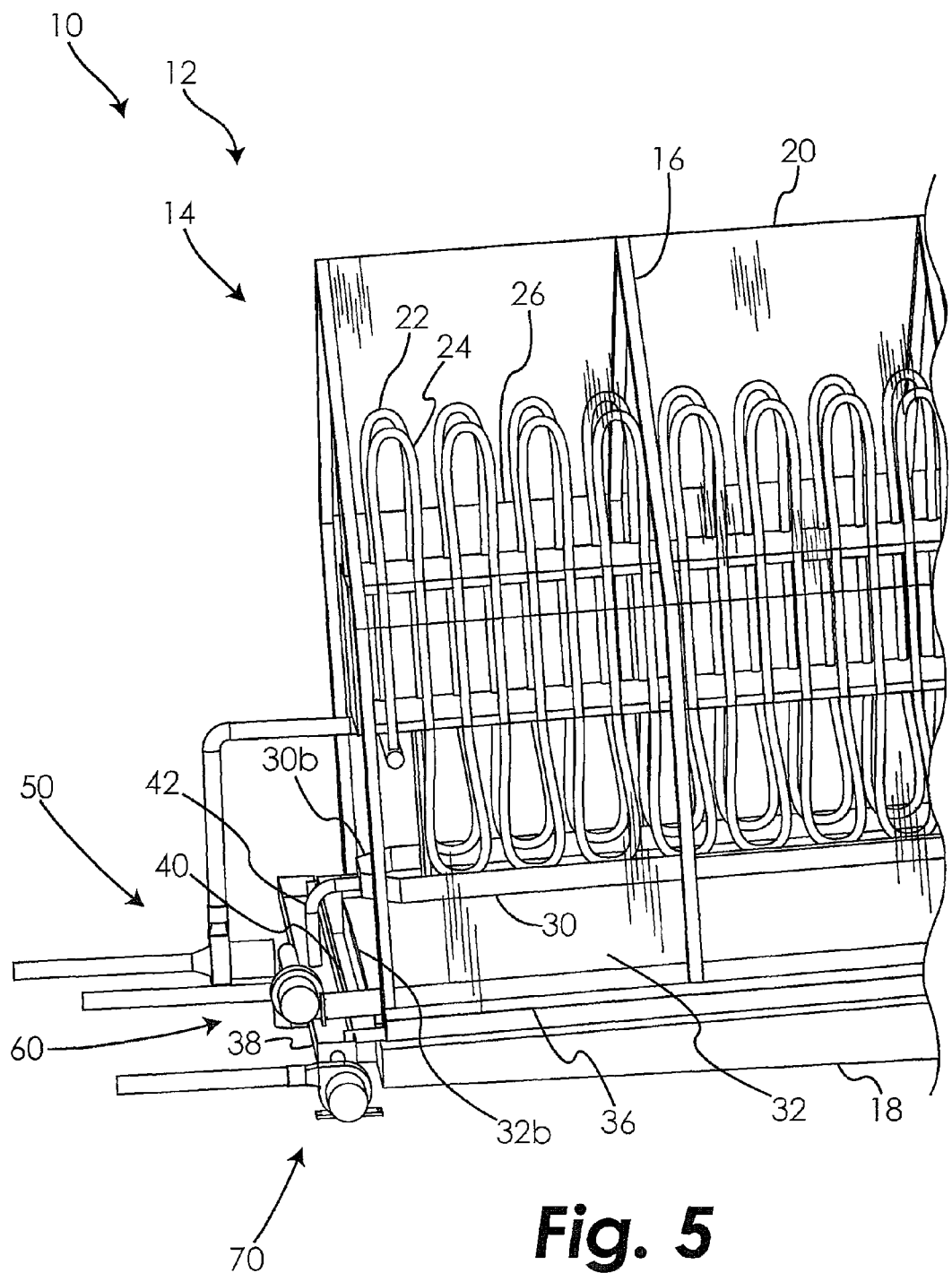
FIG. 5 is a close-up perspective view of a portion of the solar distillation system of FIG. 1.

In the illustrated embodiment, the recovered potable water collected in trough 30 and optional gutters 36 is collected in a potable water collector 38. As best illustrated in FIG. 5, collector 38 may be configured as an open gutter or trough configured for the collection of water. In the illustrated embodiments, gutters 36 are inclined based on their positioning on base member 18 and thus potable water collected in gutters 36 will flow toward collector 38 due to gravity. Additionally, in the particular illustrated embodiment the gutters extend directly into collector 38; however, it should be appreciated that pipes could extend from gutters 36 to collector 38 to allow for the transfer of potable water into collector 38. The potable water collected in trough 30 is transferred to the collector 38 via pipe 42 in the illustrated embodiment. However, it should be appreciated that the water collected in trough 30 may be transported to collector 38 in a variety of other appropriate manners as would occur to one of ordinary skill in the art. Additionally, it should be appreciated that the sizing, positioning and configuration of collector 38 can be varied from the illustrated example as would occur to one of ordinary skill in the art.

Additionally, system 10 may optionally include a mechanism for collecting the non-potable water flowing down heating surface 32. In the illustrated embodiment, system 10 includes a non-potable water collector 40 positioned between collector 38 and exit end 32b of heating surface 32 (see FIG. 5). Similar to collector 38, the illustrated collector 40 is configured as an open gutter or trough configured to collect non-potable water. In certain embodiments, non-potable water flowing down heating surface 32 toward exit end 32b will flow directly into collector 40. In other embodiments, one or more pipes or conduits may be used to transport the water from surface 32 into collector 40. Additionally, it should be appreciated that the sizing, positioning and configuration of collector 40 can be varied from the illustrated example as would occur to one of ordinary skill in the art.

In addition to solar still 12, system 10 may include one or more pump subsystems for the transport of non-potable and potable water. In certain embodiments, system 10 includes an intake pump subsystem 50 for pumping non-potable water into the solar still 12, a recycle pump subsystem 60 for pumping water from the lower end 32b of heating surface 32 back up to the upper end 32a of heating surface 32, and a potable water pump subsystem 70 for pumping the recovered potable water to a desired location for storage and/or use (see FIG. 1). Intake pump subsystem 50 includes a pump inlet 51 for pulling in non-potable water from the surrounding water environment, such as cold ocean water, and a pump outlet 52 coupled to intake ends 22a and 24a of tubular members 22 and 24 for transporting the non-potable into tubular members 22 and 24. In certain embodiments, pump inlet 51 may include one or more filtering devices, such as suction screens, to filter the incoming water as desired. It should be appreciated that the intake pump subsystem 50 can be configured and arranged in other embodiments than as illustrated, as would occur to one of ordinary skill in the art.

Additionally, potable water pump subsystem 70 includes a pump inlet 71 coupled to potable water collector 38 to pull the potable water collected from trough 30 and optional gutters 36 and a pump outlet 72 to pump the recovered potable water to a desired location. It should be appreciated that the potable water pump subsystem 70 can be configured and arranged in other embodiments than as illustrated, as would occur to one of ordinary skill in the art.

Recycle pump subsystem 60 may optionally be incorporated into system 10 as a mechanism to recycle water flowing down heating surface 32 within the solar still 12. In the particular illustrated embodiment, subsystem 60 includes a pump inlet 61 coupled to non-potable water collector 40 and a pump outlet 61 leading to distributor 34 to recycle the water back onto the heating surface 32. Subsystem 60 may include a pipe or conduit 63 running inside the solar still 12 within canopy 20 as part of pump outlet 61 or coupled thereto. In alternative embodiments, the conduit 63 may be positioned outside of the canopy 20 along the length L of the solar still 12 and return inside the canopy 20 at or near second end 12b of the solar still 12. As illustrated, conduit 63 may extend into distributor 34 so that the recycled water is transported directly into distributor 34 for return to the heating surface 32.

Figure 6:
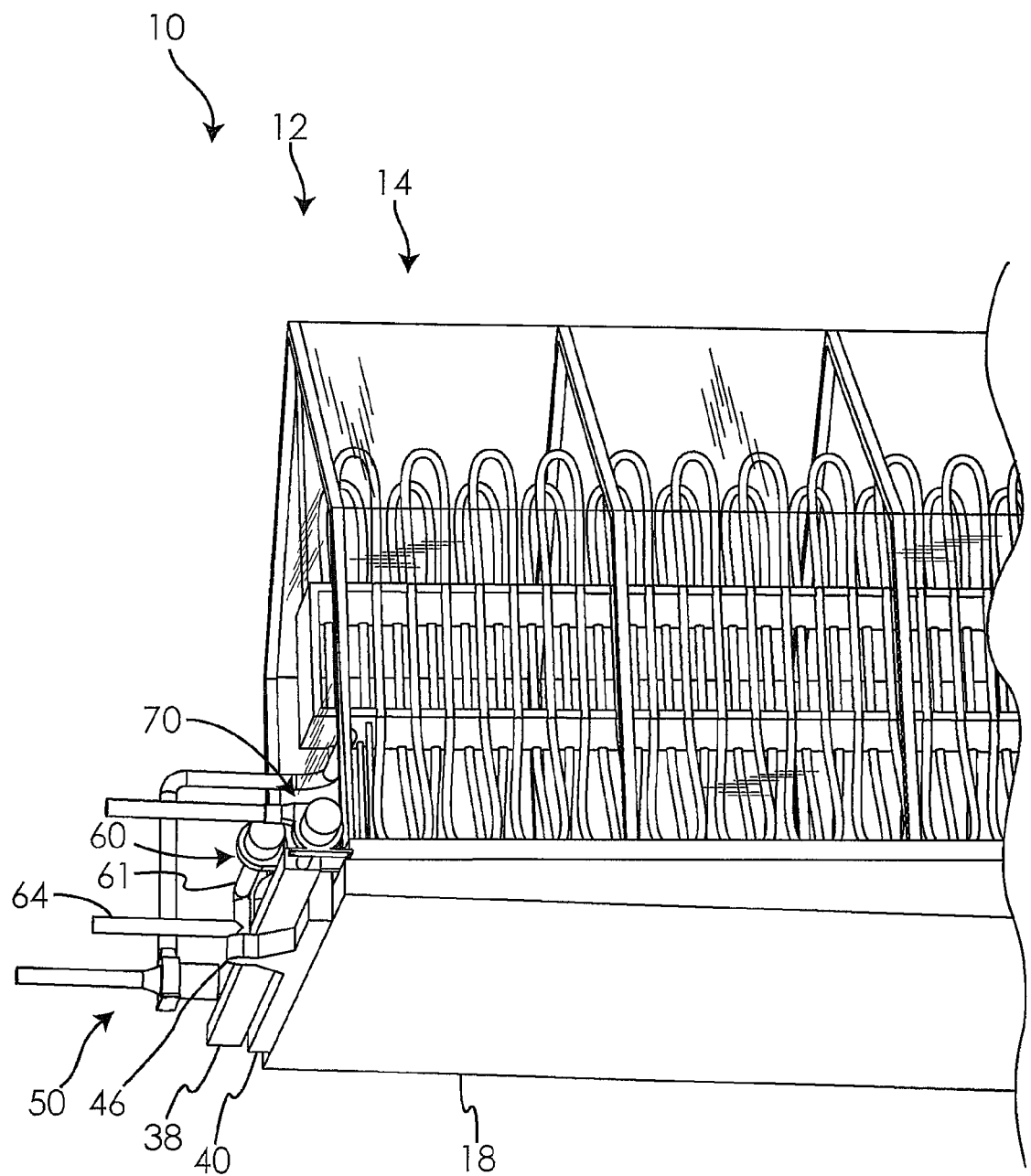
FIG. 6 is a close-up perspective view of a portion of the solar distillation system of FIG. 1.

As best illustrated in FIG. 6, subsystem 60 may include a transfer conduit 46 coupling collector 40 and pump inlet 61. As illustrated, the conduit 46 may run underneath the potable water collector 40 in certain embodiments. However, it should be appreciated that the configuration of subsystem 60 can vary as would occur to one of ordinary skill in the art, with the specific illustrated configuration being just one non-limiting example.

In certain embodiments, recycle pump subsystem 60 may be selectively activated to recycle the water only at certain times as desired and/or to recycle only a portion of the amount of water. As such, in some embodiments only a portion of the water flowing down heating surface 32 is recycled back up to the distributor 34 via recycle pump subsystem 60. In other embodiments, none of the water flowing down heating surface 32 is recycled within the solar still 12. Accordingly, system 10 may include a purge pipe 64 coupled to conduit 46 of subsystem 60 to transfer all or a portion of the non-potable water collected in collector 40 back to the surrounding water environment or another appropriate location as would occur to one of ordinary skill in the art.

Although only one example arrangement of system 10 is shown in the accompanying figures, it should be appreciated that other appropriate arrangements are contemplated by the present disclosure, the various possible arrangements being too numerous to illustrate. Additionally, although only one example size and configuration of solar still 12 is illustrated, of course solar still 12 may be sized and configured in numerous possible other ways as would occur to one of ordinary skill in the art and dependent upon the desired quantity of potable water to be recovered. For ease of illustration, solar still 12 is shown as having a length L; however, it should be appreciated that solar still 12 may be much longer than in the illustrated embodiment and may extend hundreds of meters in length in certain embodiments. Further, in certain embodiments, the inventor has discovered that a ratio of the outer surface area of the tubular members 22 and 24 to the surface area of the heating surface 23 in the range of 0.3 to 10 may be desirable. In other embodiments, the ratio may be less or greater than the example range provided herein to increase efficiency of the system. In certain embodiments, system 10 is sized and configured to recover large quantities of potable water.

Generally referring to FIGS. 1-6, implementation, operation and use of system 10 will now be discussed in greater detail. The present disclosure contemplates that the various system embodiments discussed herein may be provided and used in association with a variety of water recovery procedures in which it would be desirable to recover potable water from non-potable water. For discussion purposes only, the following example discusses the use of the system 10 with respect to potable water recovery from cool ocean water. However, it should be appreciated that the system 10 could be utilized in association with a variety of other water recovery procedures and situations, including recovering potable water from other types of saline water, sea water, wastewater, and contaminated or otherwise non-potable fresh water sources, just to name a few non-limiting examples.

Initially, cool ocean water at a first temperature is pulled from the ocean via subsystem 50 into solar still 12. Particularly, the non-potable cool ocean water is pumped into tubular members 22 and 24 at first intake end 22a and 24a. The non-potable cool water is pumped through tubular members 22 and 24 toward exit ends 22b and 24b. At exit ends 22b and 24b, the non-potable ocean water has now been at least slightly warmed inside the solar still 12. The non-potable ocean water is transported into distributor 34 for distribution across the width of the heating surface 32 at or near its upper end 32a. In certain optional embodiments, a portion of the non-potable ocean water exiting the tubular members 22 and 24 at exit ends 22b and 24b may be purged from the system via an upper end purge subsystem (not shown for ease of illustration) and thus not distributed onto heating surface 32. The excess water may be purged back to the ocean or transferred to another appropriate location as desired. In this way, the optional purging of the non-potable water at upper end 12b may allow for control of the water levels within system 10 as desired.

The non-potable water flows out the v-notches 35 defined by distributor 34 and flows onto heating surface 32. As the water flows down heating surface 32, the water is heated by solar light transmitted into the solar still 12 via light-transmitting canopy 20. A portion of the heated water evaporates from the flow of water down heating surface 32. The water vapor will condense on the tubular members 22 and 24 due to the relatively low temperature of the tubular members resulting from the cool ocean water flow therethrough. The potable water will condense on the outer surfaces of the tubular members 22 and 24 in the form of droplets which will then drip down into collection trough 30 and flow toward lower end 30b.

In addition to the evaporation and condensation of water droplets on tubular members 22 and 24, potable water will also condense on the inside surface of canopy 20. In certain embodiments, the potable water will condense in the form droplets that will move down canopy 20 and drip down into side gutters 36. The potable water collected in gutters 36 will flow toward first end 12 of the solar still 12 based on the inclination provided by base member 18. Potable water collected in trough 30 and gutters 36 flows into potable water collector 38. Potable water pump subsystem 70 coupled to collector 38 is operable to transfer the water to the desired location for storage or use. The potable water may be treated as necessary such that the water is suitable for its intended use.

The water flowing down heating surface 32 which has not evaporated runs off surface 32 into collector 40. From collector 40, all or a portion of the warmed water may optionally be discharged from the solar still 12 out purge pipe 46. The excess water may be purged back to the ocean or transferred to another appropriate location as desired. Additionally, all or a portion of the warmed water may optionally be recycled within solar still 12 and returned to the upper end of the heating surface 32 via recycle pump subsystem 60. In some situations, system 10 may be powered using only wind and solar power, by using wind energy to power the various pump subsystems associated with system 10.

Purging the non-potable water at end 12a via purge pipe 64 and/or at end 12b via the optional systems discussed above assists in controlling the total liquid levels within the solar still 12, as well as the salt levels (and/or other contaminants) within the water. Purging water at end 12b may also assist in conserving solar energy within the solar still 12 as the water exiting tubular member ends 22b and 24b to be purged at end 12b is less warm than the water that may be purged at end 12a via purge pipe 64. In other words, purging cooler water from solar still 12, and optionally leaving warmer water to be recycled within solar still 12, conserves heat within the system by purging the cooler of the two streams. Additionally, purging water at end 12a via purge pipe 64 may assist in controlling the salt levels within the system 10. In certain embodiments, non-potable water entering water collector 40 which has not been evaporated by the system may contain a higher salt concentration than the non-potable water distributed onto heating surface 32 at the upper end 32a. Purging a portion of the relatively high salt content water from the system 10 thereby reduces or controls the salt levels within the system.

In certain embodiments, the temperature differential between the temperature of the cool ocean water entering into system 10 and the temperature reached within the solar still 12 is at least 10 degrees Fahrenheit. In other embodiments, the temperature differential is at least 50 degrees Fahrenheit. In yet other embodiments, the temperature differential is at least 100 degrees. Additionally, in certain embodiments the humidity level within the solar still 12 may reach 100 percent.

In certain optional embodiments, system 10 may include panels (not shown) positioned alongside the tubular members 22 and 24 to create air flow circulation patterns which may enhance the condensation occurring on tubular members 22 and 24. The panels may be clear light-transmitting panels suspended within the solar still 12 and extend substantially the length L thereof. By positioning panels alongside the tubular members 22 and 24, the lower-temperature air occurring around the tubular members 22 and 24 (by virtue of the cool, non-potable water traveling therethrough) will fall down toward heating surface 32 creating a reverse or downflow chimney effect around tubular members 22 and 24 and thereby improving the heat transfer efficiency occurring with respect the members. In certain embodiments, the increased air flow circulation around tubular members 22 and 24 will correspondingly increase the condensation efficiency which occurs with respect to members 22 and 24.

The inventor has conducted numerous field tests in accordance with the various embodiments disclosed herein. Through many trials and errors, failures and successes, the inventor has invented a successful and efficient solar distillation system. The inventor's failures throughout the inventing process are many, including the initial use of standing water as opposed to flowing water along a heating surface as one example. The flow energy of the water along the heating surface enhances the evaporation process. As another example, initial field tests included a 1:10 ratio of the outer surface area of the tubular members to the surface area of the heating surface. Potable water recovery nearly tripled when the ratio was increased to 1:3. Additionally, increased efficiency of the system has been discovered at even higher ratios.

In some field tests, the inventor's introduction of the recycled water to the upper end of the heating surface for recycling through the solar still increased potable water recovery within the system. Further, the inventor's introduction of the ventilation system into the solar still enhanced water production in some field tests by allowing for the release and introduction of ambient air at optimal times to increase potable water production and prevent collapse of the canopy.

In many field tests, the resulting potable water production exceeded 50% of the solar insolation equivalent. The percentage of solar insolation equivalent can be determined by converting the amount of potable water production of the system into its energy equivalent, and then comparing that energy equivalent to the maximum available solar energy from the sun. Incoming solar energy can be converted to electrical power units, such as kilowatt-hours/square meter. As an example, in the equatorial desert regions, the solar energy can be as high as 8.5 kilowatt-hours/square meter per day. Knowing the amount solar energy in the particular location where the system is implemented and knowing the heat evaporation standard for water (converting a pound of water into steam), the inventor can determine the solar insolation equivalent. From that point, the inventor can compare the energy equivalent of the water production of the system. The below equations provide an example calculation using the fall insolation of 8.5 kilowatt-hours/square meter per day and standard conversion rates:

$$8.5 \text{ kwh/m}^2/\text{day} \times 3412 \text{ BTU/kw-hr} = 29{,}002 \text{ BTU/m}^2/\text{day} \quad \quad 1)$$

$$29{,}002 \text{ BTU/m}^2/\text{day} \times 4{,}046 \text{ m}^2/\text{acre} = 117.3 \text{ million BTU/acre/day} \quad \quad 2)$$

$$117.3 \text{ million BTU/acre/day} \div 970 \text{ BTU/lb water heat of vaporization} = 120{,}971 \text{ lb water evaporation/day} \quad \quad 3)$$

$$120{,}971 \text{ lb water evaporation/day} \div 8.33 \text{ lb/gal of water} = 14{,}522 \text{ gallons/acre/day at full insolation of 8.5 kwh/m}^2/\text{day} \quad \quad 4)$$

Based on the above example calculation, at the full insolation of 8.5 kwh/m²/day, 14,522 gallons of potable water is the comparable. Accordingly, if the inventor were conducting the testing at a location with the maximum 8.5 insolation level, the inventor can compare his potable water recovery to the maximum possible amount (14,522 gallons/acre/day) to determine his efficiency as compared to the maximum solar insolation level.

In some field tests, the canopy 20 reduced the solar energy received within the solar still to 70% (with 30% of the solar energy being reflected by the canopy) and the inventor unexpectedly received potable water production of over 50% of the solar insolation equivalent, thereby only losing or not converting on less than 20% of the solar energy passing into the solar still.

The table below details a few of the numerous field tests the inventor has conducted and clearly shows his unexpected, successful results. The inventor's solar still system has occupied three configurations through the evolution and refinement of the design (I, II and III in the table below). The table below summarizes the system designs and test results.

|  | Test Unit # | | |
| --- | --- | --- | --- |
|  | I | II | III |
| Heating Surf. Size/Sq. Ft | 2' × 100'/200 | 6' × 16'/96 | 6' × 16'/96 |
| Cooling tubing Sq. ft. | 13.1 | 13.1 | 52.4 |
| Inlet water flow(gal/min) | 5 gpm | 4.8 gpm | 5 gpm |
| Water inlet temp (° F.) | 85° F. | 68° F. | 83° F. |
| Water outlet temp (° F.) | 89° F. | 75° F. | 105° F. |
| Recycle water temp (° F.) | 98° F. | 105° F. | 137° F. |
| Recycle flow (gal/min) | -0- | 1 gpm | 2.5 gpm |
| Temperature in solar still (° F.) | 120° F. | 125° F. | 140+° F. |
| Distillate flow (gal/day) | 1.5 gal/day | 4.9 gal/day | 9.8 gal/day |
| Distillate flow gal/day/acre | 680 | 2220 | 4440 |
| Ambient Temperature | 85° F. | 78° F. | 86° F. |

All tests were run at latitude 31° N in an area with an estimated solar insolation rate of 5-6 kwh/m$^2$/day. For a 5.0 kwh/m$^2$/day insolation rate, test III shows a recovery rate of potable water equivalent of 52% of insolation. In test III, chilling the inlet water by 3 degrees with an ice bath yielded a 20% increase in potable water production. Ocean water is readily available at below 60° F., thereby allowing for the desired temperature differential. Additionally, test III included an improved tubing-to-floor area ratio of 0.55.

While the disclosure has been illustrated and described in detail in the drawings and foregoing description, the same is to be considered as illustrative and not restrictive in character, it being understood that only the preferred embodiment has been shown and described and that all changes and modifications that come within the spirit of the disclosure are desired to be protected.

What is claimed is:

1. A solar distillation system, comprising:
    an elongated solar still having a first end, a second end and extending along a longitudinal axis between the first and second ends;
    wherein the solar still includes a plurality of frame supports positioned along the longitudinal axis and a light-transmitting canopy supported on the frame supports extending along the longitudinal axis of the solar still and covering the first and second ends;
    wherein the solar still includes an elongate heating surface having opposite first and second ends, wherein the heating surface extends substantially the length of the solar still and is enclosed within the canopy, wherein the first end of the heating surface is positioned adjacent the first end of the solar still and the second end of the heating surface is positioned adjacent the second end of the solar still;
    wherein the solar still includes at least one tubular member having first and second ends and extending substantially the length of the solar still, wherein the tubular member is enclosed within the canopy and is spaced above the heating surface, wherein the second end of the tubular member is positioned adjacent the second end of the solar still;
    wherein the solar still includes at least one collection trough having a first end and a second end, wherein the first end is positioned adjacent the first end of the solar still and the second end is positioned adjacent the second end of the solar still, wherein the collection trough is positioned below and aligned with the tubular member to receive condensed water dripping from the tubular member; and
    wherein the solar still includes a liquid distributor positioned adjacent the second end of the heating surface, wherein the liquid distributor is for distributing water received from the second end of the tubular member substantially across the width of the heating surface.

2. The system of claim 1, wherein the heating surface is inclined such that the second end of said heating surface is positioned higher than the first end of said heating surface.

3. The system of claim 1, further comprising an intake pump system coupled with the tubular member at the first end thereof, wherein the pump system is for pulling water from a source and pumping the water into the tubular member at the first end thereof.

4. The system of claim 1, further comprising a recycle pump system for collecting water from the first end of the heating surface, pumping the water to the second end of the heating surface, and releasing the water into the liquid distributor.

5. The system of claim 1, further comprising two side gutter troughs extending substantially the length of the solar still and enclosed within the canopy, wherein the gutter troughs are positioned adjacent the canopy on the inside thereof between the canopy and the heating surface, wherein the gutter troughs are for receiving condensed water dripping from the canopy.

6. The system of claim 5, further comprising a liquid collector system positioned adjacent the first end of the collection trough to collect water from the collection trough and the side gutter troughs.

7. The system of claim 1, wherein the canopy is composed of a transparent plastic material and is secured such that the solar still is air tight.

8. The system of claim 1, wherein each of the frame supports includes a top peaked portion comprised of two angled segments meeting at a peak point with an angle of about 45 degrees between the angled segments.

9. The system of claim 1, wherein the tubular member is suspended from at least one of the frame supports.

10. The system of claim 1, wherein at least the heating surface, the tubular member, and the collection trough are angled from horizontal in the range of about 2 degrees to about 10 degrees.

11. The system of claim 1, wherein the heating surface is arched along its width.

12. The system of claim 1, wherein the tubular member extends in an undulating fashion along its length.

13. The system of claim 1, wherein the at least one tubular member includes first and second tubular members positioned in a parallel arrangement substantially along the length of the solar still.

14. A solar desalination system, comprising:
    an intake pump subsystem having a pump inlet and a pump outlet;
    a condensation subsystem including a solar still housing with a light-transmitting roof and a tubular member housed within the solar still housing, the tubular member having an intake end and an exit end, wherein the pump outlet is operatively coupled to the intake end;
    a collection trough positioned below and aligned with the tubular member within the solar still housing, wherein the trough includes a first end and a second end;

a heating surface positioned within the solar still housing, the heating surface having an intake end and an exit end; and a potable water pump subsystem having a pump inlet and a pump outlet, wherein the pump inlet of the potable water pump subsystem is operatively coupled to the second end of the collection trough;

wherein the intake pump subsystem is for pulling cool ocean water through the pump inlet from the ocean water environment and pumping the cool ocean water out the pump outlet and into the intake end of the tubular member, wherein at least a portion of the ocean water is caused to exit through the exit end of the tubular member and be released on the heating surface at or near the intake end of the heating surface so that solar heating of the ocean water on the heating surface causes a portion of the water to evaporate from the heating surface, condense on the outside of the cool tubular member, and drip into the collection trough, wherein the potable water pump subsystem is for pulling potable water from the collection trough through the pump inlet of the potable water pump subsystem.

15. The system of claim 14, further comprising a recycle pump subsystem having a pump inlet adjacent the exit end of the heating surface and a pump outlet positioned adjacent the intake end of the heating surface, wherein the recycle pump subsystem includes a tubular section positioned within the solar still housing, wherein the recycle pump subsystem is for pulling warm water through the pump inlet from the exit end of the heating surface and pumping the warm water through the tubular section and out the pump outlet so that the water is caused to be released onto the heating surface at or near the intake end of the heating surface.

* * * * *